United States Patent [19]
Fukui et al.

[11] Patent Number: 5,715,791
[45] Date of Patent: Feb. 10, 1998

[54] CYLINDER DISCRIMINATING DEVICE FOR INTERNAL COMBUSTION ENGINE

[75] Inventors: Wataru Fukui; Yasukazu Koezuka, both of Tokyo, Japan

[73] Assignee: Mitsubishi Denki Kabushiki Kaisha, Tokyo, Japan

[21] Appl. No.: 715,879

[22] Filed: Sep. 19, 1996

[30] Foreign Application Priority Data

Apr. 22, 1996 [JP] Japan .................... 8-100244

[51] Int. Cl.$^6$ ........................ F02P 7/023
[52] U.S. Cl. ........................ 123/414; 123/613
[58] Field of Search ................ 123/414, 494, 123/613, 617, 643; 73/116, 117.3, 118.1

[56] References Cited

U.S. PATENT DOCUMENTS 4,979,485 12/1990 Iwata et al. ................ 123/613
5,267,544 12/1993 Ohkumo et al. ................ 123/414
5,630,396 5/1997 Fukui et al. ................ 123/414

FOREIGN PATENT DOCUMENTS 7-58058 6/1995 Japan.

*Primary Examiner*—Tony M. Argenbright
*Attorney, Agent, or Firm*—Sughrue, Mion, Zinn, Macpeak & Seas, PLLC

[57] ABSTRACT

A cylinder discriminating device includes a ratio computing device for computing the ratio between the periods of signal generation over predetermined two sections, a signal group discriminating device for discriminating a predetermined group of signals, and a signal discriminating device for discriminating a predetermined signal from the group of signals. Thus, the cylinder discriminating device can be provided which does not provide erroneous decision in cylinder discrimination in a signal generating device in a single system, but can shorten the time required for cylinder discrimination to effect inherent control for each cylinder.

10 Claims, 9 Drawing Sheets

(NO. 2 CYLINDER)　　(NO. 1 CYLINDER)　　(NO. 3 CYLINDER)
　B75°　B5°　　　　B75°　B5°　　　　B75°　B5°
　▽　　▽　　　　　▽　　▽　　　　　▽　　▽　　　　　　　　▽

A　　　　　B　　C　　　　D

CYLINDER DISCRIMINATING DEVICE FOR INTERNAL COMBUSTION ENGINE

BACKGROUND OF THE INVENTION

1. Field of the Invention

The present invention relates to a cylinder discriminating device for an internal combustion engine which can discriminate a cylinder from other cylinders on the basis of a signal from a signal generating means in a single system.

2. Description of the Prior Art

Generally, in order to control the ignition timing, fuel jet, and the like in an internal combustion engine, a device for generating a signal in synchronism with the rotation of the engine is used. This signal generating device detects the rotation of the crank shaft of an engine or that of a cam shaft which rotates synchronously with the engine at a rotational speed that is ½ of that of the crank shaft. One example of such a signal generating means is shown in FIGS. 10 and 11. In these figures, reference numeral 1 denotes a cam shaft which rotates synchronously with an engine (not shown), and reference numeral 2 denotes a rotary disk attached to the cam shaft 1. The rotary disk 2 has windows 3 formed at the positions corresponding to desired detecting angles. Reference numeral 4 denotes a light emitting diode; 5 a photodiode for receiving the light from the light emitting diode 4; 6 an amplifier circuit for amplifying an output signal from the photodiode 5; and 7 an output transistor connected to the amplifier circuit 6 and having an open collector. The signal as shown in FIG. 12 is generated from the signal generating means. The crank angle reference signal (SGT) shown in FIG. 12 is a signal which is inverted at a prescribed crank angle for each cylinder and used as a reference signal for the crank angle.

As seen from FIG. 12, in order to discriminate the reference signal corresponding to each cylinder, immediately after the reference signal for No. 1 cylinder is generated, another signal for discriminating the cylinder is additionally generated. The interval between timings of generating these signals is measured. On the basis of the ratio of signal generating periods (or intervals) in successive two sections, a timing for a specified cylinder (No. 3 cylinder in FIG. 12) is detected. After the specified cylinder is discriminated, on the basis of this fact, other cylinders will be discriminated successively (these matters are described in Postexamined Japanese Patent Publication 7-58058). As described above, addition of the discrimination signal permits a specified cylinder to be discriminated and other cylinders to be successively discriminated, thus executing the control for each cylinder. Incidentally, as shown in FIG. 13, the output signal from the rotary signal generator 8 is supplied to a microcomputer 10 through an interface circuit 9 and is used to control operation for an ignition timing, fuel injection, etc.

The conventional cylinder discriminating device described above has the following disadvantage. Where the longest time is taken until cylinder discrimination is effected after an engine is started, it takes a time for a detection shaft (cam shaft or crank shaft) of the signal generating means to rotate by one turn. During the one turn, the control for each cylinder to be inherently effected can not be executed. This gives rise to a problem of delay of the time of starting the engine and deteriorates the performance of the engine.

In order to solve this problem, it can be proposed to add a signal for cylinder discrimination for each cylinder so as to provide different ratios between signal generation periods for respective cylinders immediately after a reference position signal is generated for each cylinder, thereby permitting a cylinder to be discriminated for each cylinder. In such a configuration, in the case of, e.g., three cylinders, the ⅓ rotation of the detection shaft of a signal generating means permits discrimination of the cylinders from one another.

However, in such a configuration, since the number of signals generated for one turn of the signal generation means is increased, it is difficult to provide different ratios between generation periods of the respective signals and necessary to provide approximated values. For this reason, when discrimination degree of signals is very low and intervals of signal generation are changed under influence of rotation variation in an internal combustion engine, erroneous decision of cylinder discrimination results. In this case, since erroneous control is effected, a serious problem that the internal combustion engine is stopped or damaged occurs.

SUMMARY OF THE INVENTION

The present invention has been completed in order to solve the above-mentioned problems.

An object of the present invention is to provide a cylinder discriminating device which does not provide erroneous decision in cylinder discrimination in a signal generating means in a single system, but can shorten the time required for cylinder discrimination to effect inherent control for each cylinder.

In order to attain the above object, in accordance with first aspect of the present invention, there is provided a cylinder discrimination device comprising a ratio computing means for computing the ratio between the periods of signal generation over predetermined two sections, signal group discriminating means for discriminating a predetermined group of signals by the first computation based on plural computation results of the ratio computing means, and signal discriminating means for discriminating a predetermined signal from the group of signals by the second computation based on the plural computation results of the ratio computing means.

In accordance with another aspect of the present invention, there is provided a ratio computing means for computing the ratio between the periods of signal generation over predetermined two sections, signal group discriminating means for discriminating a predetermined group of signals on the basis of a computation result of the ratio computing means, and signal discriminating means for discriminating a predetermined signal from the group of signals on the basis of the plural computation results of the ratio computing means.

In accordance with the present invention, since cylinder discrimination is effected by two discriminating means composed of signal group discrimination means and signal discrimination means, each discrimination means provides high discrimination performance. As a result, a cylinder discriminating device for an internal combustion engine can be provided which does not provide erroneous decision in cylinder discrimination in a signal generating means in a single system, but can shorten the time required for cylinder discrimination to effect inherent control for each cylinder.

The above and other objects and features of the present invention will be more apparent from the following description taken in conjunction with the accompanying drawings.

DESCRIPTION OF THE PREFERRED EMBODIMENTS

Embodiment 1

Figure 1:
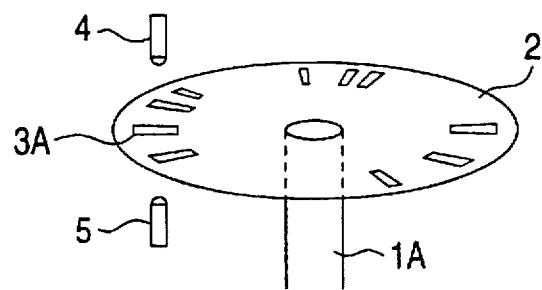
FIG. 1 is a pictorial view of a signal generating means used in the first embodiment of the present invention.
Figure 2:
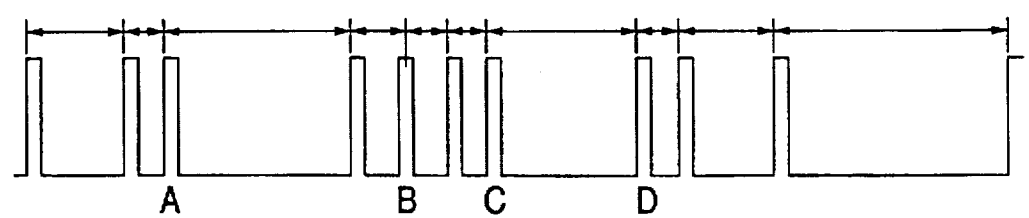
FIG. 2 is a signal waveform chart of the signal generating means used in the first embodiment.

FIG. 1 shows a signal generating means in a cylinder discrimination device for a three-cylinder engine of a four-cycle internal combustion engine according to the first embodiment of the present invention. In FIG. 1, reference numeral 1A denotes a rotary shaft (cam shaft) which rotates synchronously with a crank shaft of an engine at a rate of 1:½; and reference numeral 2 is a signal piece which rotates synchronously with the rotary shaft 1A. The signal piece 2 includes slits 3A corresponding to desired angles of the engine. FIG. 2 shows a signal waveform obtained from the signal generating means in FIG. 1.

Figure 3:
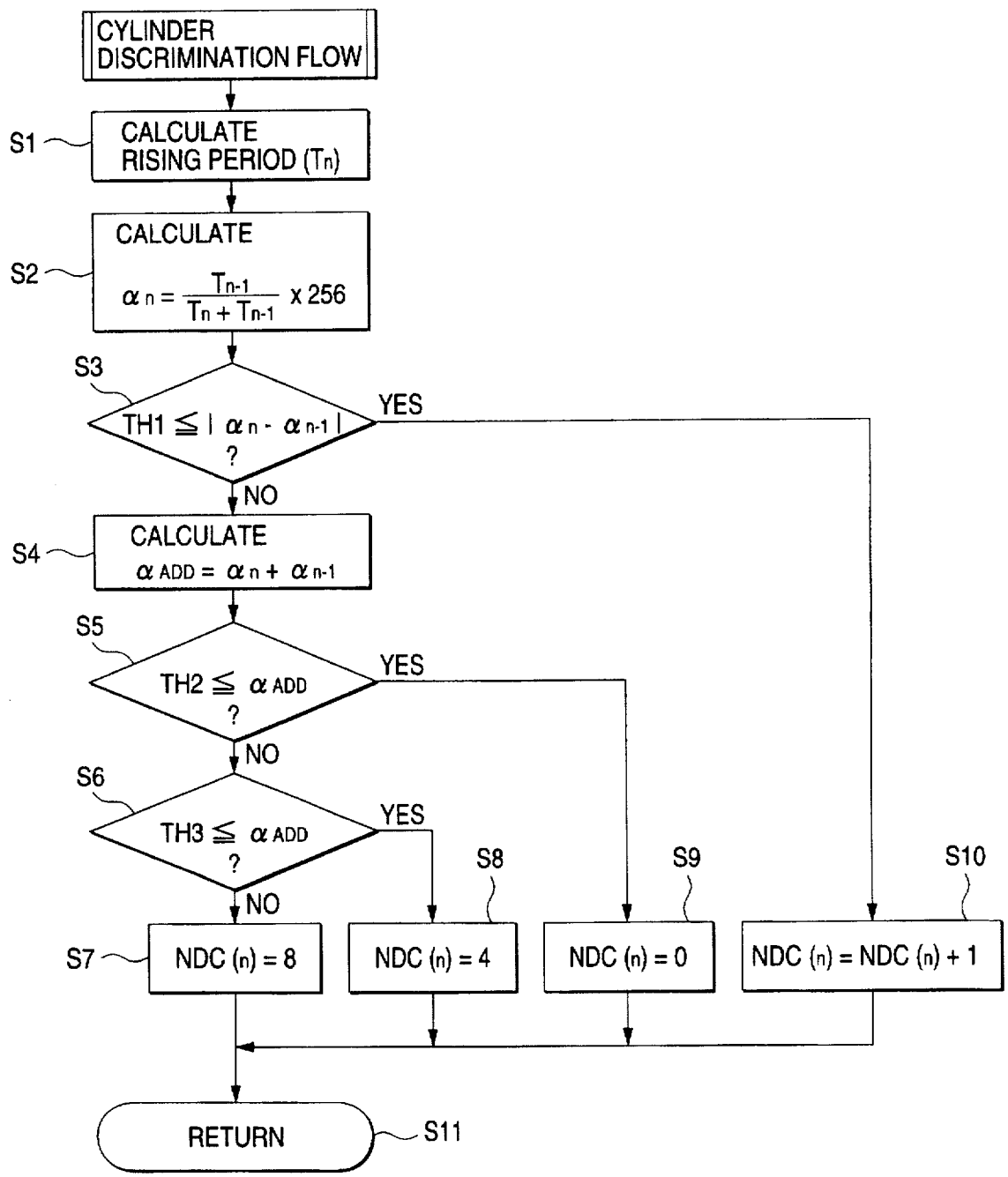
FIG. 3 is a flowchart of cylinder discrimination used in the first embodiment of the present invention.

The signal generating means shown in FIG. 1 is connected to a microcomputer through an interface circuit as in the conventional device. FIG. 3 is a flowchart of cylinder discrimination routine according to the first embodiment which will be processed by the microcomputer.

As seen from FIG. 2, the signal generating means generates, for each of cylinders (No. 1 cylinder, No. 2 cylinder and No. 3 cylinder), a first reference position signal indicative of 75° before a top dead center (BTDC75°) that is the first angular position, a second reference position signal indicative of 5° before the top dead center (BTDC5°) that is the second angle position and a discrimination signal indicative of a predetermined angular position (A, B, C and D in FIG. 2) for a specified cylinder.

The fuel and ignition timing for each of the cylinders of an engine are controlled on the basis of the first and second reference positions in FIG. 2. For example, the first reference position, i.e., 75° before the top dead center (BTDC75°) is used as a reference angle position for the control of fuel and ignition timing, and the second reference position, i.e. 5°before the top dead center (BTDC5°) is used as the ignition timing when the engine starts.

Figure 13:
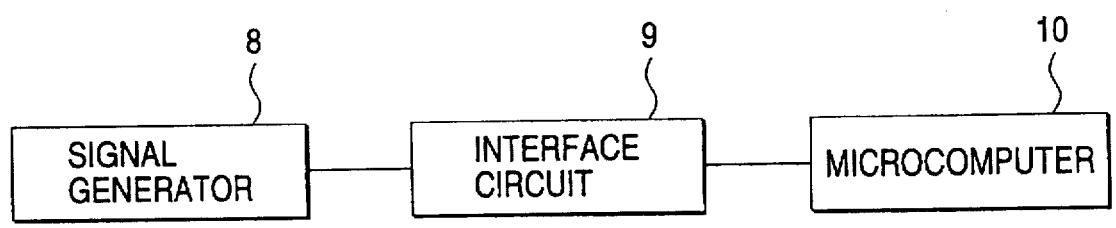
FIG. 13 is a schematic diagram of a cylinder discriminating device for an internal combustion engine.

An explanation will be given of the flow of the cylinder discrimination operation shown in FIG. 3. In step S1 corresponding to a measuring means, on the basis of each input (FIG. 2) of an angular signal sent through the interface circuit 9 from the signal generating means 8, a rising period (Tn) of a signal is computed by the microcomputer 13 shown in FIG. 13. In step S2 corresponding to the ratio operating means, the microcomputer 13 computes the ratio $(\alpha_n=(T_{n-1})/(T_n+T_{n-1})\times 256)$ which is the ratio of the previous rising period $(T_{n-1})$ to the sum of the present rising period $(T_n)$ and the previous rising period $(T_{n-1})$. The multiplication by 256 intends to obtain the numerical value that can be easily processed.

In step S3 corresponding to the signal group discrimination means, the absolute value $(|\alpha_n-\alpha_{n-1}|)$ of a difference between the present period ratio $\alpha n$ and the previous period ratio $\alpha_{n-1}$ is computed. If it is smaller than a prescribed value TH1, the flow advances to step S4. If not, the flow advances to step S10 to increment the reference position decision counter NDC(n). In step S11, the flow returns. Namely, in step S3, plural signals (group of signals) which provide operated values smaller than the prescribed value TH1 are discriminated, and the flow advances to S4.

Steps S4 to S6 corresponding to the signal discriminating means will be executed as follows. In step S4, the sum ($\alpha$ADD) of the present period ratio $\alpha$ computed in step S2 and the previous period ratio $\alpha_{n-1}$ will be computed. In step S5, this $\alpha$ADD is compared with a prescribed value TH2. If $\alpha$ADD is not smaller than the prescribed value TH2, in step S9, the reference position decision counter is set for "0", and thereafter in step S11, the flow returns. In this case, the prescribed value TH2 is set so that only a single signal, of the plural signals (group of signals) discriminated in step S3, has an operation value not smaller than the prescribed value TH2 in step S5. In step S5, if $\alpha$ADD is smaller than the prescribed value TH2, the flow goes to step S6.

In step S6, $\alpha$ADD is compared with a prescribed value TH3. If $\alpha$ADD is not smaller than the prescribed valuer TH3, in step S8, the reference position decision counter is set for "4". If $\alpha$ADD is smaller than the prescribed value, the flow goes to step S7 where the reference position decision counter is set for "8". In step S11, the flow returns. In this case, the prescribed value TH3 is set so that only a single signal, of the plural signals (group of signals) discriminated in step S3, has an operation value not smaller than the prescribed value TH3 in step S6 and only another single signal has an operation value smaller than the prescribed valuer TH3 in step S6.

Figure 4:
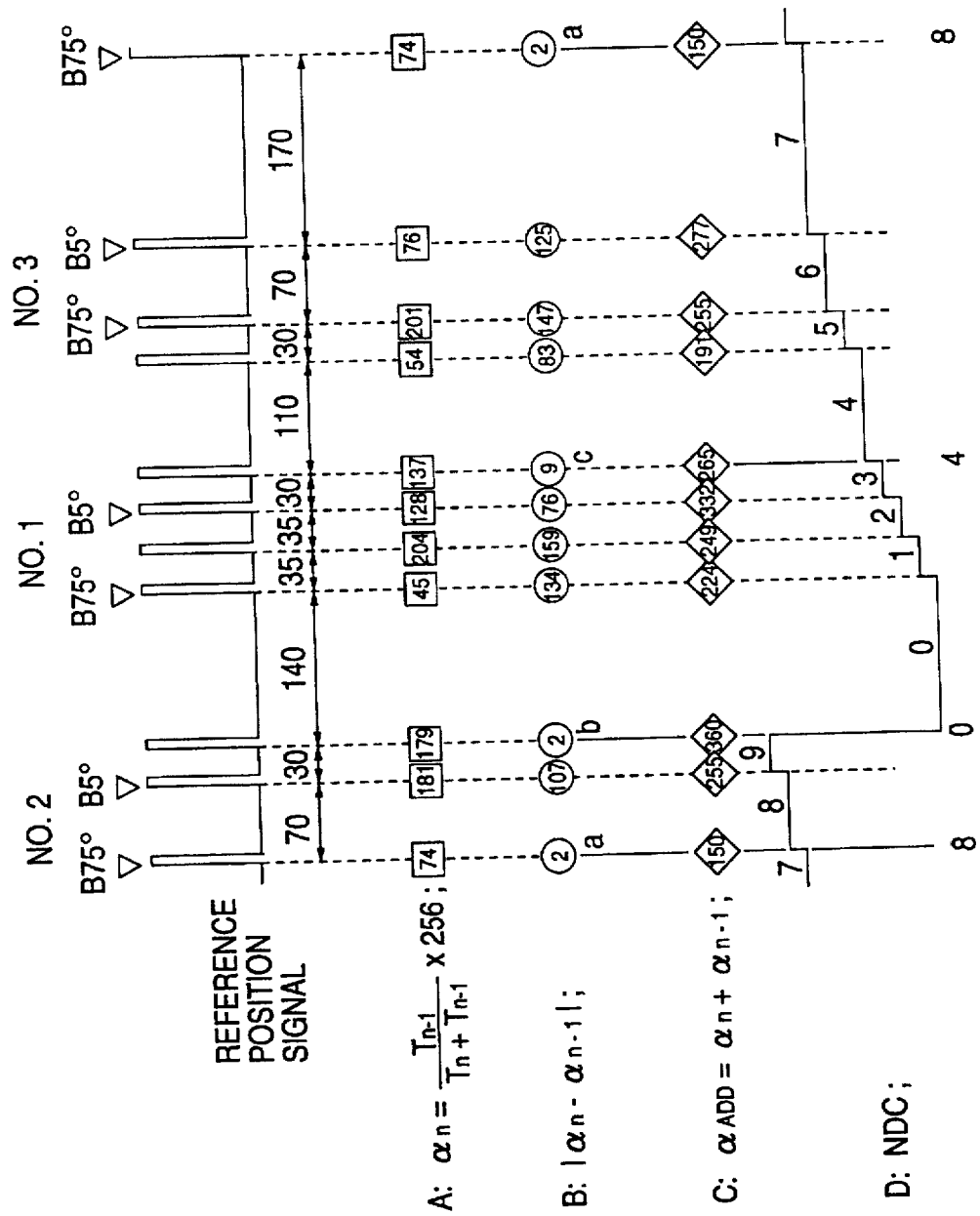
FIG. 4 is a view for explaining the operation of a cylinder discrimination device for an internal combustion engine according to the first embodiment.

Now referring to concrete numerical values indicated in FIG. 4, an explanation will be given of the cylinder discrimination operation along the flowchart in FIG. 3. Part A shows the result $\alpha_n$ of computation in step S2 in FIG. 3. The result $\alpha_n$ is the value multiplied by 256 so as to be easily processed by the microcomputer. Part B shows the absolute value of the difference between the present period ratio $\alpha_n$ and the previous period ratio $\alpha_{n-1}$ computed in step S3 in FIG. 3. Part C shows the sum $(\alpha_{ADD})$ of the present period ratio $\alpha_n$ and the previous period ratio $\alpha_{n-1}$ in step S4 in FIG. 3. Three characteristic signals a, b and c (signal group) whose value is smaller than "10" (prescribed value TH1) in the operation B in FIG. 4 are discriminated. It is apparent that since the operated values corresponding to three signals a, b and c (signal group), which are greatly different from that corresponding to the other signals, these signals a, b and c can be very clearly discriminated from the other signals. Since the operated values $(\alpha_{ADD})$ in part C for these three signals (a, b and c) which are "300" (prescribed value TH2)

or larger, "200" (prescribed value TH3) or larger and other values, these three signals (a, b, c) can be discriminated. In this case also, it is apparent that since the operated values corresponding to three signals a, b and c (signal group) are greatly different from one another, these three signals a, b and c (signal group) can be clearly discriminated. Part D shows the operation of the reference position decision counter (NDC) described in FIG. 3. At the timings of these three signals (a, b and c), the reference position decision counter (NDC) is set for "8", "0" and "4" (FIG. 3:S7–S9), and at the other timings, it is incremented (FIG. 3:S10). Thus, on the basis of the values of the reference position decision counter (NDC), the correspondence between each signal and an engine angular position can be discriminated, thereby permitting the cylinders to be discriminated from one another. If the cam shaft is provided with a signal generating means as in the first embodiment, it is desired that the number of discrimination signals is not smaller than that of cylinders.

Embodiment 2

Figure 5:
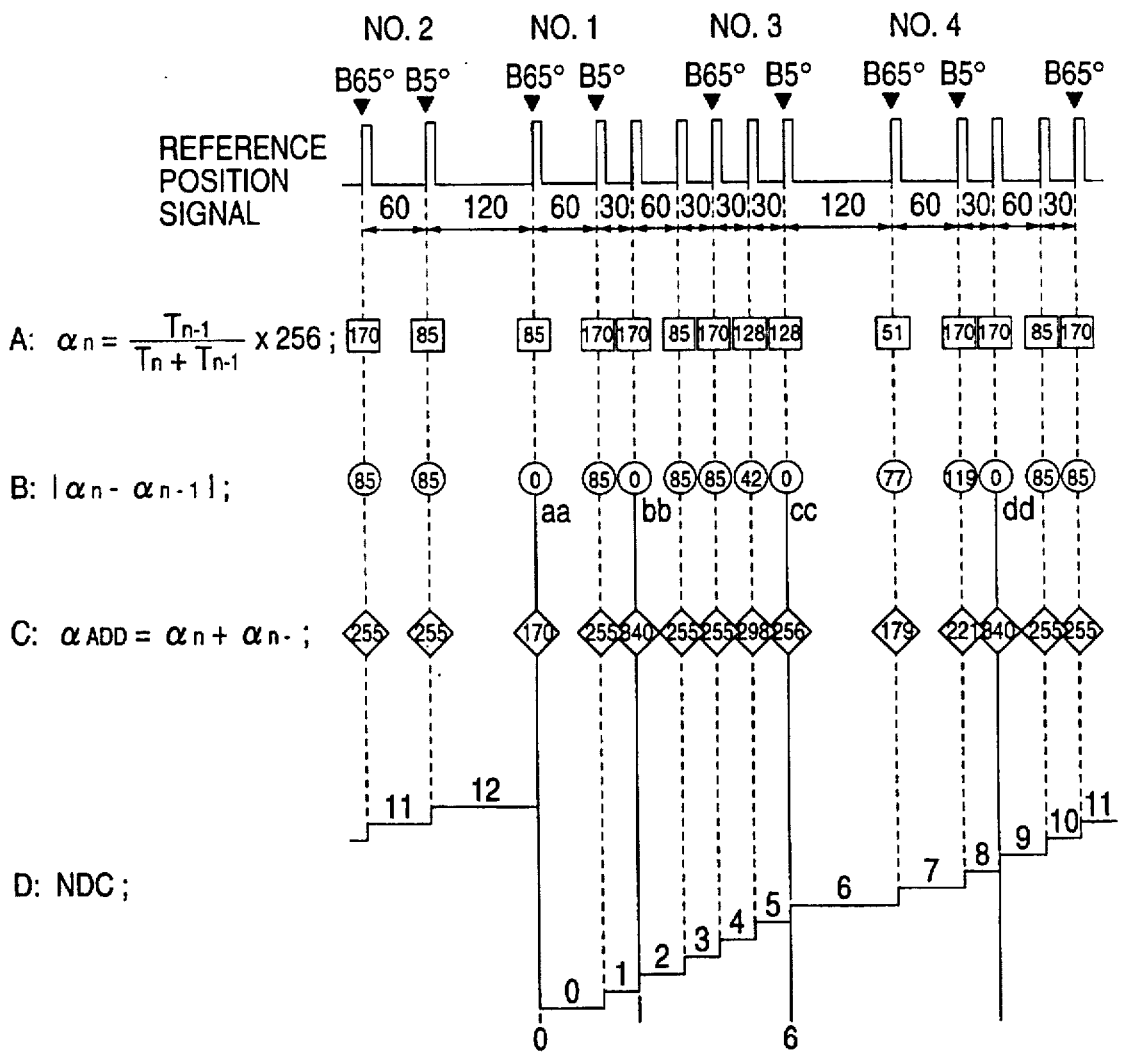
FIG. 5 is a view for explaining the operation of a cylinder discrimination device for an internal combustion engine according to the second embodiment.

In the first embodiment, although an explanation has been given of the three-cylinder engine, the present invention can be applied to an engine with a different number of cylinders. FIG. 5 shows the operation of a cylinder discrimination device of the four-cylinder engine for a four-cycle internal combustion engine.

The flowchart of cylinder discrimination is basically the same as that shown in FIG. 3 adopted in the first embodiment. In FIG. 5, part A shows the result $\alpha_n$ of computation of the period ratio in the reference position signal; part B shows the absolute value of the difference between the present period ratio $\alpha_n$ and the previous period ratio $\alpha_{n-1}$; and part C shows the sum ($\alpha_{ADD}$) of the present period ratio $\alpha_n$ and the previous period ratio $\alpha_{n-1}$. Four characteristic signals aa, bb, cc and dd (signal group) whose operated values in the part B are smaller than "10" in the operation of part B in FIG. 5 are discriminated from the other signals. It is apparent that since the operated values corresponding to four signals aa, bb, cc and dd (signal group), which are greatly different from those corresponding to the other signals, these signals aa, bb, cc and dd can be very clearly discriminated from the other signals. Since the operated values ($\alpha_{ADD}$) in part C for these four signals (aa, bb, cc and dd) which are classified into "300" or larger, "200" or larger and other values, these four signals (aa, bb, cc and dd) can be classified into three values. In this case also, it is apparent that since the operated values corresponding to four signals aa, bb, cc and dd (signal group) are greatly different from one another, these four signals aa, bb, cc and dd (signal group) can clearly discriminated. Part D shows the operation of the reference position decision counter (NDC). At the timings aa and cc of these four signals (aa, bb, cc and dd), the reference position decision counter (NDC) is set for "0", and "6", and at the other timings, it is incremented from one another. Thus, on the basis of the values of the reference position decision counter (NDC), the correspondence between each signal and an engine angular position can be discriminated, thereby permitting the cylinders to be discriminated from one another.

Embodiment 3

Figure 6:
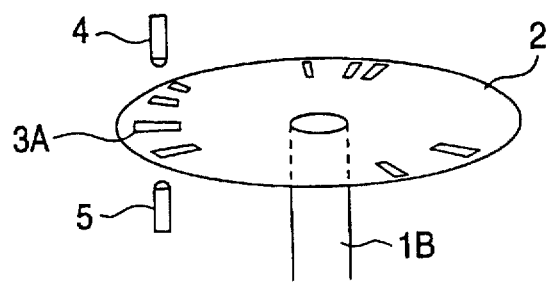
FIG. 6 is a pictorial view of the signal generating means used in the third embodiment of the present invention.
Figure 7:
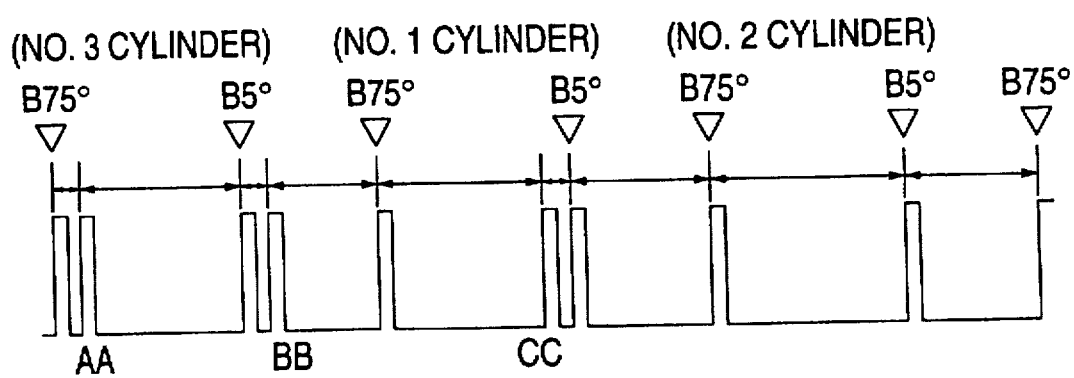
FIG. 7 is a signal waveform chart of the signal generating means used in the third embodiment.

FIG. 6 shows the operation of a cylinder discrimination device of the three-cylinder engine for a four-cycle internal combustion engine. In FIG. 6, reference symbol 1B denotes a crank shaft of an engine. FIG. 7 shows the signal waveform obtained by the signal generating means.

As seen from FIG. 7, the signal generating means generates, for each of cylinders (No. 1 cylinder, No. 2 cylinder and No. 3 cylinder), a first reference position signal indicative of 75° before a top dead center (BTDC75°) that is the first angular position, a second reference position signal indicative of 5° before the top dead center (BTDC5°) that is the second angular position and a discrimination signal indicative of a predetermined angular position (AA, BB and CC in FIG. 7) for a specified cylinder.

Figure 8:
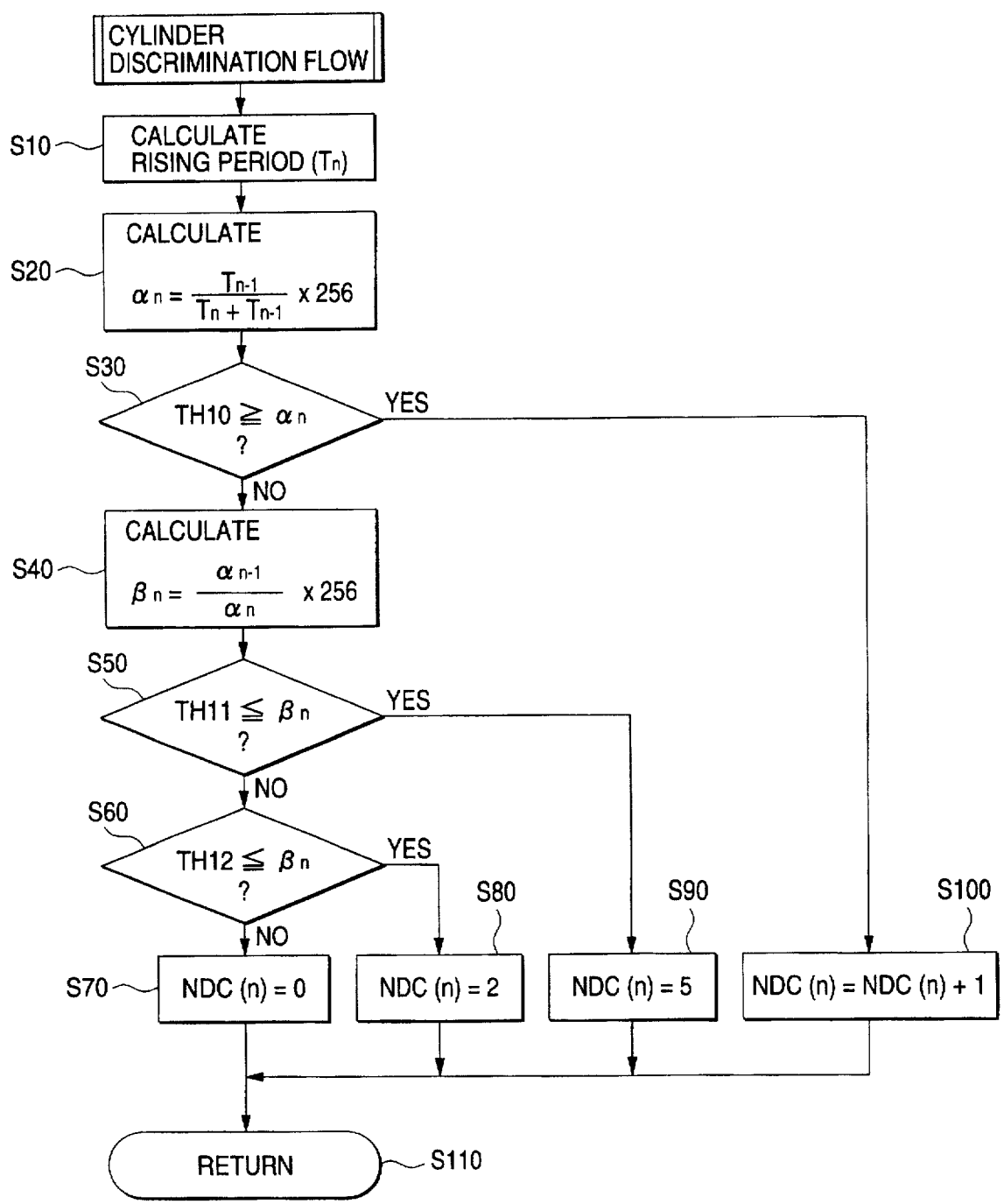
FIG. 8 is a flowchart of cylinder discrimination used in the third embodiment of the present invention.

Referring to the flow of cylinder discrimination routine according to the third embodiment shown in FIG. 8, an explanation will be given of the cylinder discrimination operation. In step S10 corresponding to a measuring means, on the basis of each input (FIG. 7) of an angular signal supplied from a rotary signal generating means, a rising period (Tn) of a signal is computed. In step S20 corresponding to the ratio operating means, computed is the ratio ($\alpha_n = (T_{n-1})/(T_n + T_{n-1}) \times 256$) which is the ratio of the previous rising period ($T_{n-1}$) to the sum of the present rising period ($T_n$) acquired in step S10 and the previous rising period ($T_{n-1}$). The multiplication by 256 intends to obtain the numerical value that can be easily processed.

In step S30 corresponding to the signal group discrimination means, the present period ratio $\alpha_n$ is compared with a prescribed value TH10. If it is smaller than the prescribed value TH10, the flow goes to step S100 where the reference position counter (NDC(n)) is incremented. If not, the flow advances to step S40. Specifically, in step S30, plural signals (signal group) which are smaller than the prescribed value are discriminated, and the flow goes to step S40.

Steps S40 to S60 corresponding to the signal discriminating means will be executed as follows. In step S40, the ratio ($\beta_n = (\alpha_{n-1}/\alpha_n)*256$) of the present ratio $\alpha$ to the previous ratio $\alpha_{n-1}$ is computed. In step S5, the operated value ($\beta_n$) is compared with a prescribed value TH11. If $\beta n$ is not smaller than the prescribed value TH11, in step S90, the reference position decision counter (NDC(n)) is set for "5", and thereafter in step S110, the flow returns. In this case, the prescribed value TH11 is set so that only a single signal, of the plural signals (group of signals) discriminated in step S30, has an operation value not smaller than the prescribed value TH11 in step S50. In step S50, if the operated value ($\beta_n$) is smaller than the prescribed value TH11, the flow goes to step S60.

In step S60, the operated value is compared with a prescribed value TH12. If $\beta_n$ is not smaller than the prescribed value TH12, in step S80, the reference position decision counter is set for "2", and in step S110, the flow returns. In step S60, if the operated value ($\beta_n$) is smaller than the prescribed value TH12, the flow goes to step S70 where the reference position decision counter is set for "30". In step S110, the flow returns. In this case, the prescribed value TH12 is set so that only a single signal, of the plural signals (group of signals) discriminated in step S30, has an operated value not smaller than the prescribed value (12) in step S60 and only another signal has an operated value smaller than the prescribed value (12) in step S60.

Figure 9:
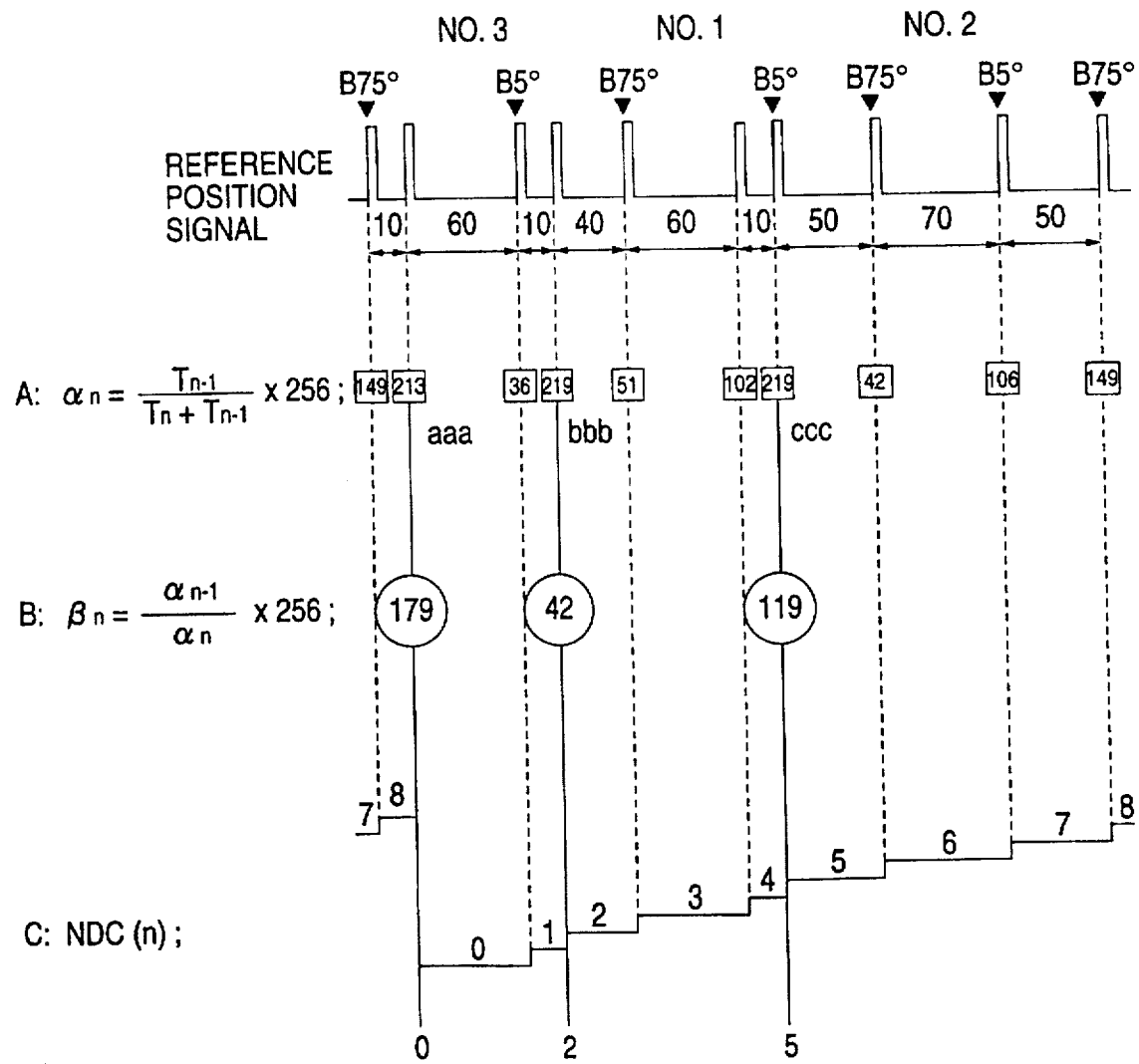
FIG. 9 is a view for explaining the operation of a cylinder discrimination device for an internal combustion engine according to the third embodiment.
Figure 10:
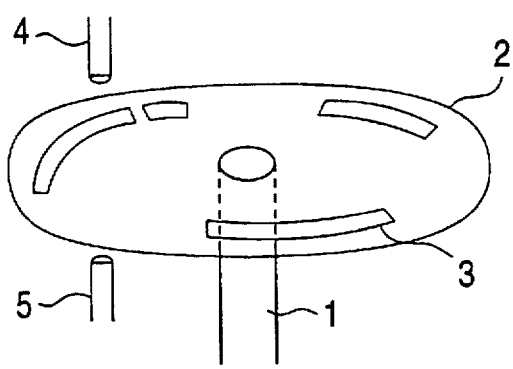
FIG. 10 is a pictorial view of a conventional signal generating means.
Figure 11:
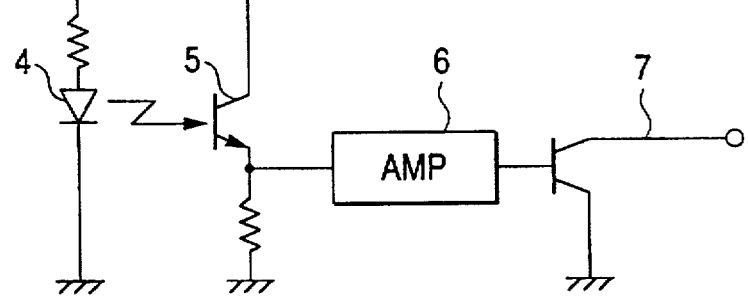
FIG. 11 is a circuit diagram of signal processing of the conventional signal generating means.
Figure 12:
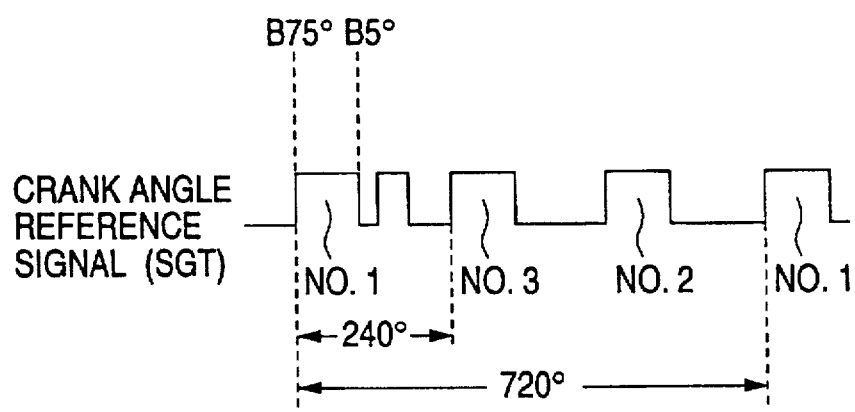
FIG. 12 is a signal waveform chart of the conventional signal generation means.

Now referring to concrete numerical values indicated in FIG. 9, an explanation will be given of the cylinder discrimination operation along the flowchart in FIG. 8. Part A shows the result $\alpha_n$ of computation in step S20 in FIG. 8. The $\alpha_n$ is the value multiplied by 256 so as to be easily processed by the microcomputer. In terms of $\alpha_n$, three signals aaa, bbb and ccc (signal group) that are not smaller than "200" (predetermined value TH10) are discriminated. It is apparent that since the operated values corresponding to three signals aaa, bbb and ccc (signal group), which are greatly different from that corresponding to the other signals, these signals aaa, bbb and ccc can be very clearly discriminated from the other signals.

Part B shows the divided value ($\beta_n$) of the previous period ratio $\alpha_{n-1}$ by the present period ratio $\alpha_n$ computed by step S40. These three signals aaa, bbb and ccc (signal group) whose values in part B are "150" (prescribed value TH11) or larger, "70" (prescribed value TH12) or larger, and other values can be discriminated from one another. In this case also, it is apparent that since the operated values corresponding to three signals aaa, bbb and ccc (signal group) are greatly different from one another, these three signals aaa, bbb and ccc (signal group) can be clearly discriminated from one another.

Part C shows the operation of the reference position decision counter (NDC(n)). At the timings of these three signals (aaa, bbb and ccc), the reference position decision counter (NDC) is set for "0", "2" and "5" (FIG. 8:S70–S90), and at the other timings, it is incremented (FIG. 8:S100). Thus, on the basis of the values of the reference position decision counter (NDC(n)), the correspondence between each signal and an engine angular position can be discriminated, thereby permitting the cylinders to be discriminated from one another. If the crank shaft is provided with a signal generating means as in the third embodiment, it is desired that the number of discrimination signals is ½ or larger than that of the cylinders.

What is claimed is:

1. A cylinder discrimination device comprising:

signal generating means for generating a first and a second reference signal indicative of a predetermined first and second angular position synchronously with a crank shaft of an engine and corresponding to each of cylinders, and a discrimination signal indicative of a predetermined angular position corresponding to a specified cylinder;

measuring means for measuring a generation period of a signal outputted from said signal generating means;

ratio computing means for computing a ratio of the periods of signal generation over predetermined two sections according to a plurality of results of measurement of said measuring means;

signal group discriminating means for discriminating a predetermined group of signals on the basis of a computation result of the ratio computing means; and signal discriminating means for discriminating a predetermined signal from the group of signals on the basis of the plural computation results of the ratio computing means.

2. A cylinder discrimination device according to claim 1, wherein said ratio computing means computes a ratio of $T_{n-1}/(T_{n-1}+T_n)$ or $T_n/(T_{n-1}+T_n)$ on the basis of a previous signal generation period $T_{n-1}$ and a present signal generation period $T_n$ which have been acquired by said ratio computing means.

3. A cylinder discrimination device according to claim 1, wherein said signal discrimination means performs multiplication and division processing using the computation results continuous in time passage.

4. A cylinder discrimination device according to claim 1, wherein said signal generating means generates synchronously at a rate of 1:1 with a crank shaft of an engine, and the number of said discrimination signals is equal to ½ or larger than that of cylinders.

5. A cylinder discrimination device according to claim 1, wherein said signal generating means generates synchronously at a rate of 1:½ with a crank shaft of an engine, and the number of said discrimination signals is equal to or larger than that of cylinders.

6. A cylinder discrimination device according to claim 1, wherein said signal group discriminating means discriminates the predetermined group of signals by the first computation based on plural computation results of said ratio computing means; and signal discriminating means discriminates the predetermined signal from the group of signals by the second computation based on the plural computation results of said ratio computing means.

7. A cylinder discrimination device according to claim 6, wherein said ratio computing means computes a ratio of $T_{n-1}/(T_{n-1}+T_n)$ or $T_n/(T_{n-1}+T_n)$ on the basis of a previous signal generation period $T_{n-1}$ and a present signal generation period $T_n$ which have been acquired by said ratio computing means.

8. A cylinder discrimination device according to claim 6, wherein said first and said second computations are subtraction and addition, and vice versa using two ratio computation results continuous in time passage.

9. A cylinder discrimination device according to claim 6, wherein said signal generating means generates synchronously at a rate of 1:1 with a crank shaft of an engine, and the number of said discrimination signals is equal to ½ or larger than that of cylinders.

10. A cylinder discrimination device according to claim 6, wherein said signal generating means generates synchronously at a rate of 1:½ with a crank shaft of an engine, and the number of said discrimination signals equal to or larger than that of cylinders.

* * * * *